United States Patent [19]

Hotten

[11] 3,970,568

[45] July 20, 1976

[54] ALIPHATIC SULFURIZED ESTER LUBRICANT

[75] Inventor: Bruce W. Hotten, Orinda, Calif.

[73] Assignee: Chevron Research Company, San Francisco, Calif.

[22] Filed: July 3, 1975

[21] Appl. No.: 592,934

Related U.S. Application Data

[63] Continuation-in-part of Ser. No. 500,235, Sept. 5, 1974, abandoned.

[52] U.S. Cl..................................... 252/48.6; 72/42
[51] Int. Cl.²...................... C10M 1/38; C10M 3/32; C10M 5/28; C10M 7/36
[58] Field of Search......................... 252/48.6; 72/42

[56] References Cited
UNITED STATES PATENTS 3,825,495 7/1974 Nervingham et al. ............. 252/48.6
3,850,825 11/1974 Vienna et al. ...................... 252/48.6

Primary Examiner—Delbert E. Gantz
Assistant Examiner—I. Vaughn
Attorney, Agent, or Firm—G. F. Magdeburger; C. J. Tonkin; J. T. Brooks

[57] ABSTRACT

Compositions are provided which are aliphatic sulfurized esters of olefinic mono- or dicarboxylic acids which do not contain any allylic hydrogen atoms. Synergistic mixtures of esters sulfurized with sulfur and with sulfur monochloride and sulfur dichloride are provided. Also provided are lubricating oil compositions comprising (A) a major amount of an oil of lubricating viscosity, and (B) an amount effective to impart extreme-pressure and/or antiwear lubricating properties to said oil of these sulfurized esters.

9 Claims, No Drawings

ALIPHATIC SULFURIZED ESTER LUBRICANT

RELATED APPLICATION

This application is a continuation-in-part of application Ser. No. 500,235, filed Sept. 5, 1974, now abandoned.

BACKGROUND OF THE INVENTION

1. Field of the Invention

This invention relates to sulfurized esters of olefinic carboxylic acids and to lubricating oil compositions containing these sulfurized esters as extreme-pressure agents. Such compositions exhibit extreme-pressure lubricating properties and are useful in cutting oils and for lubricating relatively moving parts such as in power transmission assemblies, gear trains and engines, particularly internal combustion engines.

Metal-cutting oils should be light-colored for good visibility of the work piece. Pleasant, or at least mild, odors are required for the health and comfort of the machine operator. In addition, the cutting oils must provide extreme-pressure lubrication for the work tool in order to provide the longest possible tool life before resharpening or replacement. In other lubricating applications where the operator is not exposed to vapors from the oil and visibility of the lubricated part is not crucial, color and odor of the oil may not be as important as extreme-pressure lubrication and antioxidant protection. However, odor and appearance are important to those who must prepare the lubricating oil additives, compound the oils and handle the oils as they are being used.

The reaction products of sulfur and olefinic compounds such as cracked wax, lard oil and sperm whale oil are dark brown or black even when diluted to the final use levels with oil. In addition, these compounds are malodorous, smelling of hydrogen sulfide and mercaptan by-products. Previously, light-colored, mild-smelling sulfur compounds for use in cutting oils have been made by chlorination or sulfochlorination followed by treatment with sodium polysulfide. This multi-step indirect process is expensive and, accordingly, the cutting oils prepared therefrom are expensive.

What is needed are light-colored, mild-smelling lubricating oil compositions which can be prepared from inexpensive materials by an inexpensive, preferably one-step, process. This invention fulfills this need rather nicely.

2. Prior Art

Smith, U.S. Pat. No. 2,683,119, describes compositions for imparting oiliness and film strength to lubricating oils. The compositions have at least two esterified carboxylic acid groups and at least one sulfur atom in a thiolinkage. All of the illustrated examples of suitable acids contain allylic hydrogen atoms.

Hutchinson et al., U.S. Pat. No. 3,740,333, disclose compositions useful as substitutes for sperm oil. The compositions are blends of triglycerides and wax esters. The wax esters are derived from unsaturated fatty acids containing 18, 20 or 22 carbon atoms. The triglycerides are of the same fatty acids. The blend of the wax ester and triglycerides is sulfurized by conventional means.

SUMMARY OF THE INVENTION

Sulfurized esters of olefinic mono- or dicarboxylic acids which do not contain any allylic hydrogen atoms have been discovered which are excellent additives for lubricating oils and metal working and cutting oils. In a preferred embodiment, mixtures of sulfurized and sulfochlorinated materials are provided, the mixtures displaying a synergistic improvement in drilling torque lowering.

Lubricating oil compositions have also been discovered comprising: (A) a major amount of an oil of lubricating viscosity, and (B) an amount effective to impart extreme-pressure properties to the oil of these sulfurized esters. Lubricating oil compositions containing these sulfurized esters are relatively quite light in colour and are mild smelling. Their sulfur content provides excellent extreme-pressure lubricating properties. In addition, almost no hydrogen sulfide is evolved during preparation of the sulfurized esters; thus, an air-polluting by-product is avoided.

DETAILED DESCRIPTION OF THE INVENTION

Compositions suitable for use as additives to lubricating oils and metal-working and cutting oils comprise sulfurized esters of olefinic mono- or dicarboxylic acids which do not contain any allylic hydrogen atoms.

The lubricating oil compositions of this invention comprise (A) a major amount of an oil of lubricating viscosity, and (B) an amount effective to impart a beneficial effect, such as extreme-pressure and antiwear properties to the oil of these sulfurized esters.

The esters from which the sulfurized esters are prepared are esters of olefinic mono- or dicarboxylic acids and low-to-medium molecular weight alcohols, neither of which contain any allylic hydrogen atoms.

The Carboxylic Acids

As mentioned above, the esters are prepared from mono- and dicarboxylic acids which do not contain allylic hydrogen atoms. Allylic hydrogen atoms are well known to those skilled in the art. They are hydrogen atoms bonded to saturated carbon atoms which are alpha to a double bond. An example of this is shown in the following Formula I.

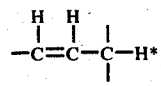

In Formula I the hydrogen marked with an asterisk is an allylic hydrogen. An example of a carboxylic acid which contains no allylic hydrogens is acrylic acid ($CH^2$=CH—COOH). An example of a carboxylic acid which contains allylic hydrogens is methacrylic acid ($CH^2$=C($CH^3$)—COOH). In methacrylic acid, the methyl group bonded to the alpha carbon atom is a saturated carbon atom to which are bonded hydrogen atoms. This saturated carbon atom is alpha to the double bond of acrylic acid; therefore, the hydrogen atoms on the methyl group are allylic hydrogen atoms.

Examples of suitable monocarboxylic acids for use in this invention include acrylic acid, 2,4-pentadienoic acid (beta-vinyl acrylic acid), 4,4-dimethylpenta-2-enoic acid and other similar compounds. Suitable monocarboxylic acids such as mentioned above can be represented by the general formula

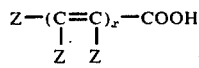   II wherein $x$ represents 1, 2 or 3, preferably 1, and Z represents hydrogen or a hydrocarbyl radical bonded to the remainder of the carboxylic acid through a tertiary carbon atom. Examples of suitable hydrocarbyl radicals include t-butyl, t-pentyl, t-hexyl, t-octyl, t-dodecyl, t-hexadecyl, t-octadecyl and the like. Generally, the monocarboxylic acids will contain 30 or less carbon atoms. Preferably, not more than one Z substituent per molecule represents a hydrocarbyl radical and more preferably, all Z substituents represent hydrogen.

Suitable dicarboxylic acids include fumaric acid (trans-butendioic aicd), maleic acid (cis-butenedioic acid), muconic acid (hexadiendioic acid), 2-t-butylfumaric acid, 2-t-butyl maleic acid, 2-t-butyl muconic acid and the like. In general, suitable dicarboxylic acids useful in this invention can be represented by the following formula:

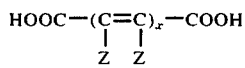   III wherein $x$ and Z have the same meaning as defined above for Formula II. Generally, the dicarboxylic acids will contain 30 or less carbon atoms.

Of course, for purposes of preparing the esters to be sulfurized, the anhydrides and acid halides of the above-described mono- and dicarboxylic acids can be used, and this invention contemplates their use. The anhydrides can be simple or mixed anhydrides and include external anhydrides such as acrylic anhydride and internal anhydrides such as maleic anhydride.

The Alcohols

Suitable alcohols which may be combined with the carboxylic acids described above to form the esters which are then sulfurized to form the compositions of this invention include lower- to medium-chain-length alcohols. Suitable alcohols include lower- to medium-molecular-weight aliphatic alcohols such as the lower- to medium-molecular-weight alkanols. Examples include those containing from 1–30 carbon atoms. The aliphatic portion of the alkanol may contain minor, sometimes adventitious, amounts of atoms other than carbon and hydrogen such as oxygen, halogen, nitrogen and sulfur. The aliphatic portion of the alcohols can be straight- or branched-chain and may contain a small number of sites of unsaturation. Generally, the alcohol contains not more than one olefinic site per alcohol molecule and preferably is completely saturated. If the aliphatic portion of the alcohol contains any sites of unsaturation, it should not contain any allylic hydrogens.

In general, suitable alcohols useful in preparing the compositions of this invention can be represented by the formula

R—OH   IV.

wherein R represents the remainder of the alcohol exclusive of the hydroxyl group, suitably containing from 1 to 30 carbon atoms, preferably containing from 1 to 12 carbon atoms, and more preferably containing from 4 to 8 carbon atoms. R generally is aliphatic in nature and may contain olefinic sites of unsaturation as discussed above.

Suitable low- to medium-molecular weight alcohols include methanol, ethanol, propanol, isopropanol, butanol, isobutanol, sec-butanol, t-butanol, pentanol, 2-ethylhexanol, octanol, decanol, hexadecanol, octadecanol, tripropylene oxo alcohol, tetrapropylene oxo alcohol, ethoxyethanol and the like.

The Esters

The esters are formed from the above-described carboxylic acids and the above-described alcohols. Methods of preparing these esters are well known to those skilled in the art. They include, for example, direct combination of the acid with the alcohol, sometimes using mineral acid catalysis to hasten the reaction. Water may be removed to drive the reaction to completion. In other instances, acid halides or acid anhydrides can be reacted with the alcohol. Preparing the esters forms no part of this invention and need not be further illustrated.

In general, suitable esters of monocarboxylic acids useful in this invention can be represented by the following formula

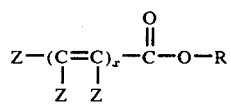   V and suitable esters of dicarboxylic acids useful in this invention can be represented by the following formula

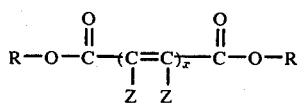   VI wherein R, Z, and $x$ have the same meaning as defined above.

Preparation of the Sulfurized Esters

The esters can be sulfurized, generally without difficulty, simply by combining the above-described ester and elemental sulfur, sulfur monochloride or sulfur dichloride.

Sulfurization can be conducted at any temperature at which the reaction takes place below the decomposition temperature of the reactants or the reaction products. It is generally preferable to conduct the reaction at an elevated temperature to increase the rate of reaction. Preferably, the reaction between the sulfur and the ester is conducted between about 100° and 200°C, preferably 120°–200°C. This reaction is generally continued from about 0.5–48 hours, more generally from about 2–24 hours.

The reaction between the ester and sulfur monochloride or sulfur dichloride typically goes easily at lower temperatures than the reaction between the ester and elemental sulfur. Typically, this reaction can be carried out between about 60° and 200°C, preferably between about 80° and 180°C. The reaction is generally continued for about 0.5–48 hours, preferably 2–36 hours.

The mol ratio of sulfur or sulfur chloride to the ester can vary widely. For this purpose it is usually convenient to calculate the mols of sulfur or its equivalent present in the sulfur chloride used per olefinic bond present in the ester. Sulfur-to-olefinic bond ratios can range from 0.5–2:1, preferably 0.75–1.5:1. Mol ratios of approximately 1:1 are preferred, since this generally leads to high sulfur content without leaving excess free sulfur in the reaction product which may settle out upon standing.

Most of the lower-molecular-weight esters are liquid at room temperature or at least at elevated reaction temperatures. Thus, a reaction solvent is not necessary. Generally, the ester and the sulfur or sulfur chloride are simply combined in the reaction vessel and the reaction mass is heated to the desired temperature with agitation. Heating and agitation are continued throughout the reaction period, after which the product is allowed to cool to ambient temperature.

After the reaction product has cooled to ambient temperature, it may be desirable to allow it to stand from 1 to 3 days to allow unreacted excess sulfur to settle out. The product can then be filtered to remove this sulfur.

The filtered product thus obtained is generally suitable without further purification for adding to lubricating oils, which may be then used to lubricated relatively moving parts and as cutting oils in metal-working operations.

For esters which are not liquids at room temperature, it is generally preferable to use a reaction solvent. Suitable reaction solvents include any solvent with which the ester is miscible or in which it is soluble and which does not interfere with the sulfurization reaction. Thus, solvents which contain double bonds and particularly those which contain allylic hydrogens should be avoided, since this will lead both to hydrogen sulfide evolution and to dark-colored products. The solvents can be lower-boiling petroleum fractions which may be readily removed after the sulfurization reaction if the reaction product is a liquid at room temperature. If the reaction product is not liquid at room temperature, the solvent is generally not completely removed. In this latter case, higher-boiling petroleum fractions may be desirable, particularly fractions which have approximately the same boiling range and viscosity range as lubricating oils to which the sulfurized esters may be added. The diluent oil for the sulfurized ester will then simply form a suitable part of the ultimate lubrication oil composition.

When reaction solvents are used, whether they are lower-boiling solvents which will be removed after the reaction is complete or the higher-boiling petroleum fractions which are not removed, it is generally preferable to use the least amount of solvent possible, as this increases the concentration of the reactants. Higher concentrations of the reactants may not only improve the reaction rate, but also increase reactor capacity.

The sulfurized esters which are obtained, particularly those made from lower-molecular-weight carboxylic acid esters such as the alkyl acrylates are liquid at room temperature and have a low enough viscosity to allow pumping and easy handling at room temperature. Furthermore, these sulfurized esters are readily miscible with lubrication oils. They are also much lighter in color, especially after dilution in oil to normal working levels, than ordinary sulfurized compounds made by direct reaction of sulfur. In addition, these sulfurized esters have a mild and pleasant odor.

Lubricating and Cutting Oils

While the sulfurized esters of this invention which are liquid at ambient temperatures can be used neat in metalcutting and working operations, it is most practical and economical to dilute the sulfurized esters with an inexpensive carrier oil.

Suitable carriers are those which are suitable for use in lubricating oils and cutting oils. The sulfurized esters of this invention are present in the lubricating oils and metal working and cutting oils of this invention in an amount effective to impart extreme-pressure lubricating properties to the oil. Generally, the effective amount of these sulfurized esters in the oils ranges from about 0.1 to about 20%w, preferably from about 0.5 to about 15%w and more preferably from about 1 to about 10%w. In cutting oil applications it is common to blend the sulfurized ester with the oil to obtain a specific sulfur content. For cutting oil applications, sulfur concentrations can range from about 0.1–10%w, preferably about 0.5–5%w and more preferably about 0.5–2%w.

The sulfurized esters can be prepared as concentrates. They are then blended with a carrier oil prior to ultimate use. Those sulfurized esters which are liquid at room temperature are generally prepared without a reaction solvent and, accordingly, the concentrate contains 100% of the sulfurized ester. Adding diluent oils to these concentrates would simply increase the shipping costs, generally without compensating benefits such as easier handling. Those sulfurized esters which are not liquid at room temperature or which are very viscous liquids at room temperature can be prepared as highly concentrated packages. Again, to keep the shipping cost to a minimum, the quantity of diluent oil in these concentrate packages is kept to a minimum. Generally, the sulfurized ester will comprise about 20 to about 95%w and preferably is at least 50%w of the concentrate package.

The lubricating oil compositions prepared by the invention contain an oil of lubricating viscosity. This oil should be an oil of a viscosity suitable for the purpose for which the final composition is intended. They are generally lubricating oil fractions of petroleum, either naphthenic or paraffinic base, unrefined, acid-refined, solvent-refined or hydrocracked as required in the particular lubricating or cutting need. Also, synthetic oils meeting the necessary viscosity requirements, either with or without viscosity index improvers or other additives, may be used as the base stock.

The viscosity of the lubricating or cutting oil will vary greatly depending upon the use for which it is intended. It is well within the skill of those in the art to tailor the lubricating oil composition to the desired specification by choosing the appropriate base stock, mixing various base oils, and/or compounding these oils or mixtures thereof with various viscosity index-improving agents commercially available.

In addition to the sulfurized ester described in this invention, the oils, particularly lubricating oils, can contain a variety of other compounding agents such as dispersants, detergents, extreme-pressure agents, viscosity index-improvers, and other materials known to be useful in compounding lubricating oils to meet the various exacting specifications demanded by the particular use to which the lubricating oil is to be put.

For metal-working operations, the lubricant compositions of this invention can be applied to the metal prior to the working operation in any suitable manner which insures thorough contact of the surface of the metal. For example, the lubricant can be brushed or sprayed on the metal, or the metal can be immersed in a bath of the lubricant.

The following examples are included for further understanding of the invention.

EXAMPLES

EXAMPLE 1

To a 2-liter resin flask equipped with a stirrer, nitrogen inlet, condenser, thermometer and an Ascarite-filled gas absorption tube was added 842 grams (4.576 mols) of 2-ethylhexyl acrylate and 146 grams (4.576 mols) of elemental sulfur. With agitation, the reaction mass was heated to 160°C under a nitrogen blanket for 21 hours at which time the reaction mass was cooled to ambient temperature and filtered through Celite 545. 955 grams of filtrate were recovered which had a sulfur content of 14.0%w.

EXAMPLE 2

To a 1-liter glass resin flask equipped as in Example 1 was added 184 grams (1 mol) of 2-ethylhexyl acrylate and 32 grams (1 mol) of elemental sulfur. With agitation, the reaction mass was heated to 160°C under a nitrogen blanket and maintained between 160°C and 170°C for 14 hours. The reaction mass was cooled and filtered to yield 206 grams of product containing 13.5%w sulfur.

By a similar procedure, sulfurized butyl acrylate was prepared from butyl acrylate and elemental sulfur. The reaction product obtained contained 20%w sulfur.

Similarly, sulfurized di-n-butyl fumarate was obtained from di-n-butyl fumarate and elemental sulfur. The product contained 10.9%w sulfur. In a similar manner, di-n-butyl maleate was reacted with elemental sulfur. NMR analysis showed the maleate isomerized to the fumarate.

By a similar procedure, cellosolve acrylate (ethoxyethyl acrylate) was sulfurized with elemental sulfur to yield a product containing 17.7%w sulfur.

EXAMPLE 3

To a 1-liter glass resin flask equipped as in Example 1 was charged 368 grams (2 mols) of 2-ethylhexyl acrylate. With stirring, 135 grams (1 mol) of sulfur monochloride was added from a dropping funnel over a 20-minute period. No exotherm was observed. The reaction mass was heated with agitation under a nitrogen blanket to 120°C and maintained at this temperature, plus or minus 5°C, for 22 hours. At the end of the reaction period the reaction mass was cooled to room temperature and filtered with the aid of a vacuum to yield 453 grams of filtrate containing 10.99%w chlorine and 7.67%w sulfur and 27 grams of filter residue which contained 97.1%w sulfur and less than 0.2%w chlorine. The filter residue had a melting point of 113°–114°C.

EXAMPLE 4

A. In order to insure that commercial sulfur dichloride was pure, a portion of the material was chlorinated as follows: 5352 g of commercial sulfur dichloride from Stauffer Chemical Company was placed in a large vessel and cooled to 10°C. 363 g of chlorine was added to the material over a period of 3 hours, while the temperature was maintained at 8°–10°C.

B. A 20,000-g portion of 2-ethylhexyl acrylate was placed in a large vessel equipped with stirring and heating means. A 5605-g portion of the product of "A" was added with stirring over a period of 15 minutes. During this time the temperature was 23.9°C. After 15 minutes, the temperature had increased to 76.7°C. After an additional 13 minutes, the temperature had increased to 111.1°C and after an additional 7 minutes had dropped to 108.9°C. The mixture was then heated to about 130°C and maintained at that temperature with stirring for 24 hours. The mixture was then cooled to 15.6°C and filtered through a 3-micron cartridge-type filter.

The yield of material was 23,770 g. The product contained 6.41% by weight sulfur and 11.2% by weight chlorine.

EXAMPLE 5 — DRILLING TORQUE TEST

The compounds prepared above were tested for their properties as additives for cutting oils in the Drilling Torque Test. In this test a drill press with variable power feed and a variable speed is used. A drilling torque measuring system comprised of a rotating work piece holder, a table, a torque arm, a strain gauge, a load cell, and a recorder is used. The drill bits are high speed, steel, jobbers-length drills, ⅜ inch diameter, preground to 130° cutting edge. The drilling test material is type 304 stainless steel used in 6 × 6 × 1½ inch blocks.

The torque measuring system is calibrated to zero and the final stopping point of 110 inch-pounds of torque is determined.

A precision ground drill is securely tightened in the drill press chuck. The drill feed rate is set at 0.014 inch per revolution. The drill press is adjusted for the desired rate of revolution and the oil pump is started. The drill is manually lowered until it is almost touching the test block. The automatic feed is then engaged and a hole is drilled. When the hole is complete, the drill bit is raised, the work block is rotated and a new hole is drilled. This procedure is continued at the constant selected rate of revolution until the drilling torque exceeds the limit of 110 inch-pounds or until 50 holes have been drilled with a single drill bit. Table I shows the results of testing several sulfurized compounds prepared according to this invention as well as one commercially available cutting oil additive. In addition, combinations of the esters sulfurized with sulfur and with sulfur monochloride and sulfur dichloride were tested.

TABLE I

| Test | Additive at 0.8%w S or (S+Cl) | Drilling Torque Test Sulfur Content of Additive, %w | Additive Concentration in Test Oil, %w | Holes Drilled at RPM 600 | 800 | 1000 |
|---|---|---|---|---|---|---|
| 1 | Commercially available cutting oil additive Acrylate | 46 | 2 | 24 | 1 | 0 |
| 2 (A) | Butyl + 1 mol S* | 20 | 4 | 2 | 1 | 1 |
| 3 (B) | 2-Ethylhexyl + 1 mol S | 14 | 5.7 | 26 | 6 | 1 |
| 4 (C) | 2-Ethylhexyl + 1.3 mol S | 20 | 4 | 38 | 27 | 1 |
| 5 (D) | 2-Ethylhexyl + 0.5 mol Monochloride | 7.7 S 11% Cl | 4 | 50+ | 25 | 5 |
| 6 (E) | 2-Ethylhexyl + 0.5 mol dichloride | | 4 | — | 30 | 8 |
| 7 | C'** and D | — | 2.5 C', 2.0 D | 50+ | 50+ | 19 |
| 8 | C' | 16 | 5 | — | 27 | 4 |
| 9 | C' and E | — | 2.5 C', 2.0 E | — | 50+ | 8 |

*Indicates mols of sulfurizing agent per mol of olefinic bonds in the carboxylate.
**C' was the same as C prepared with 1.1 mol of S per mol of ester.

From the above data it can be seen that the sulfurized esters of this invention impart to lubricating oils excellent properties for metal cutting operations. In particular, the sulfurized 2-ethylhexyl acrylates exhibited properties far superior to the commercially available cutting oil additive in the Drilling Torque Test, and the combinations of esters sulfurized with sulfur alone and with the sulfur chlorides are superior to each employed by itself. This Drilling Torque Test has been found from experience to correlate well with actual field operations.

EXAMPLE 6

Several of the above sulfurized carboxylates were tested to determine their effectiveness as motor oil additives.

Copper Strip Corrosion Test

The Copper Strip Corrosion Test determines corrosivity of lubricating oils towards nonferrous metals. In this test a copper strip is immersed into a lubricating oil composition containing the test additive. The lubricating oil composition is maintained at 250°F (121°C) for 3 hours. The degree of discoloration of the copper strip is obtained from a comparison chart. A rating of 1a indicates a very low degree of discoloration and consequently very slight corrosivity of the lubricating oil composition towards copper. Ratings of higher numbers such as 1b or 2a show higher reactivity, which may be desirable for oils used under heavy loads. Further details of this test may be determined by reading ASTM Test Method D-130. The results of testing the compositions of this invention in the Copper Strip Corrosion Test are set forth in Table II.

Oxidator B Test

The stability of an oil composition against oxidative change is measured by the time required for the consumption of one (1) liter of oxygen by 100 grams of a est oil at 340°F (171°C). For convenience, the actual test uses 25 grams of oil and the results are corrected to a 100-gram sample. A catalyst containing a mixture of soluble salts is added to the oil which provides 95 parts per million (ppm) copper, 80 ppm iron, 4.8 ppm manganese, 1100 ppm lead and 49 ppm tin. Table II reports values obtained from subjecting the lubricating oil compositions of this invention to the Oxidator B Test.

Four-Ball Wear Test

Antiwear properties of lubricating oil additives under boundary lubrication conditions can be determined by means of the well-known Four-Ball Test. In this test three ½ inch-diameter steel balls are clamped together and immersed in the test lubricant. A fourth steel ball is rotated at about 1800 rpm in contact with three other balls. A specified load, in this case 20 kilograms, is applied, forcing the rotating ball against the three stationary balls. The test is run for 60 minutes and the sizes of the wear scars on the three stationary balls are measured and the average scar size in millimeters is reported. The smaller the scar, the greater the antiwear properties of the test lubricant. For example, base oils commonly give wear scars of 0.60 mm or greater at 20-kg load. Generally lubricants which give a wear scar of less than 0.5 mm at 20-kg load are considered acceptable antiwear agents and lubricants which give wear scars of less than 0.4 mm at 20-kg load are considered exceptionally good antiwear lubricants. Table II sets forth the results of testing lubricating oil compositions according to this invention in the Four-Ball Wear Test.

Falex Extreme Pressure Test

The capability of lubricating oil compositions to lubricate under extreme pressures can be measured by this test. The Falex machine is manufactured by the Faville-LeVally Corporation of Chicago, Ill. In this test two opposing stationary V-blocks are pressed by a nutcracker arrangement of lever arms towards each other against an interposing rotating steel shaft. The rotating shaft is driven by a chuck through a brass shear pin. The V-block and pin test specimens are immersed in a vessel of the test lubricant at a preselected temperature. The machine is operated 290 rpm and the specimens are broken in at 300 pounds loading. During the test, loading between the V-blocks and the rotating pin is increased automatically until seizure occurs. This failure point is indicated by sheering of the brass pin holding the rotating shaft. The load at failure in pounds is taken as a quantitative measure of the extreme-pressure properties of the oil compositions. Mineral oils may fail at 600 to 900 pounds. Oils with moderate extreme-pressure additives will fail at 1000 to 2000 pounds and very effective extreme-pressure additives will permit loadings in excess of 3000 pounds. The limit of the test machine is 4500 pounds. The results of testing oil compositions of this invention in this test are set forth in Table II.

Lubricating oil compositions according to this invention were prepared from sulfurized butyl acrylate containing 20%w sulfur and sulfurized 2-ethylhexyl acrylate containing 19%w sulfur. These sulfurized additives were added to a base oil which was a neutral, solvent-refined lubricating oil having a viscosity of 480 SUS at 100°F. This base oil contained 6%w of a polyisobutenyl succinimide produced by reacting succinic anhydride substituted with a polybutenyl group having a number average molecular weight of about 950 with tetraethylene pentamine at an amine to succinic anhydride mol ratio of about 0.87. The base oil also contained 0.1%w of terephthalic acid. The results of testing this base blend in the above-described tests are also set forth in Table II.

Example 5, 0.1%w terephthalic acid, 0.8%w tetrapropenyl succinic acid, 1%w of sulfurized diparaffin polysulfide (17.5%w sulfur), 1.5%w of sulfurized 2-ethylhexyl acrylate containing approximately 19%w sulfur and 0.1%w benzotriazole as a copper deactivator. In this test the test oil had a copper corrosivity rating of 3a, a significant improvement over the 4c rating shown in Table II, and a bearing weight loss after 40 hours of 33 mg. In this test a bearing weight loss of less than 40 mg after 40 hours of operation is acceptable.

EXAMPLE 8

The tests of Example 6 were repeated on lubricating oil compositions of this invention. In this series of tests the base oil contained no additional additives. The base oil was a solvent-refined neutral lubricating oil having a viscosity of 480 SUS at 100°F. The results of the test are set forth in Table III.

TABLE III

SULFURIZED ACRYLATES AND FUMARATES

| Additive - Reactant Mole Ratio | Color | Product Analysis S,% Cl,% | Concentration, % | Tests Oxidator B, Hr. | 4-Ball Wear, mm | Falex EP, Lb |
|---|---|---|---|---|---|---|
| None (480 Neutral Oil) | | | | 0.5 | 0.76 | 900 |
| Acrylates | | | | | | |
| n-Butyl Acrylate/S | Lt. Br. | 20 | 1* | 2.3 | 0.47 | 1850 |
| | | | 2 | 6.0 | 0.56 | 2160 |
| 2(n-Butyl Acrylate)/S₂Cl₂ | Tan | — — | 2 | | | 2250 |
| 2-Ethylhexyl Acrylate/S | Tan | 14 | 1.5* | 3.1 | 0.40 | |
| | | | 2 | 3.3 | 0.42 | 2180 |
| 2(2-Ethylhexyl Acrylate)/3 S | Lt. Br. | 19 | 2 | | | >4500 |
| Ethoxyethyl Acrylate/S | Lt. Br. | 18 | 1.1* | 2.5 | 0.44 | 2130 |
| 2(2-Ethylhexyl Acrylate)/S₂Cl₂ | Tan | 7.7 | 11  1 | 5.5 | 0.46 | 4100 |
| | | | 2.6* | 9.9 | 0.42 | 3820 |
| Dibasic Acid Ester | | | | | | |
| Di-n-butyl Fumarate/S | Lt. Br. | 11 | 1.7* | 2.1 | 0.44 | 2430 |
| | | | 2.0 | 2.4 | 0.43 | 2160 |

*At constant 0.2% S level in oil blend.

As can be seen from the above data, the lubricating oil compositions of this invention possess excellent antioxidant, antiwear and extreme-pressure lubricating properties.

TABLE II

| Additive | Concentration, %w | Cu Strip at 250°F, 3 Hr. | Oxidator B, Hr. | 4-Ball Wear at 20 kg, mm | Falex EP, Lb |
|---|---|---|---|---|---|
| Base Blend | — | 1a | 0.5 | 0.65 | 950 |
| Sulfurized Butyl Acrylate (20% S) | 1 | 4c | 3.0 | 0.38 | 4500+ |
| | 2 | 4c | 4.6 | 0.46 | 4500+ |
| | 4 | 4c | 4.3 | 0.44 | 3380 |
| Sulfurized 2-Ethylhexyl Acrylate (19% S) | 1 | 4c | 4.1 | 0.39 | 1580 |
| | 2 | 4c | 5.1 | 0.44 | 3180 |
| | 4 | 4c | 5.0 | 0.51 | 2480 |

As can be seen from the above data, the lubricating oil compositions of this invention provide excellent antioxidation properties, antiwear protection and extreme-pressure protection. However, copper corrosivity is relatively high but no higher than that found in some sulfur-containing lubricating oil used successfully as motor oils.

EXAMPLE 7 — BEARING WEIGHT LOSS TEST

A lubricating oil composition of this invention was tested in the L-38 Bearing Weight Loss Engine Test. In this test the lubricating oil used contained 6%w of the same polyisobutenyl succinimide described above in

What is claimed is:

1. A lubricating oil composition comprising:
    A. a major amount of an oil of lubricating viscosity, and
    B. an amount effective to impart extreme-pressure and/or antiwear lubricating properties to said oil of an aliphatic sulfurized ester of an olefinic mono- or dicarboxylic acid which does not contain any allylic hydrogen atoms.

2. A lubricating composition of claim 1 wherein said acid contains from 3 to 200 carbon atoms and the remainder of the alcohol of said ester contains 1 to 30 carbon atoms.

3. A lubricating oil composition of claim 2 wherein said sulfurized ester contains from 0.5 to 2 mols of sulfur per olefinic bond of said acid.

4. A lubricating oil composition of claim 3 containing from 0.1–10% weight sulfur from said sulfurized ester.

5. A lubricating oil composition of claim 4 in which prior to sulfurization said ester of an olefinic monocarboxylic acid has the formula

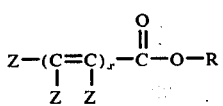

and said ester of an olefinic dicarboxylic acid has the formula

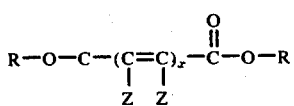

wherein
1. $x$ represents 1, 2 or 3;
2. each R independently represents the remainder of an esterified alcohol containing from 1 to 30 carbon atoms; and
3. each Z independently represents hydrogen or a hydrocarbyl group not containing any allylic hydrogen atoms.

6. A lubricating oil composition of claim 5 wherein each R independently represents the remainder of an esterified alcohol containing from 1 to 12 carbon atoms and each Z independently represents hydrogen or a hydrocarbyl containing from 4 to 30 carbon atoms.

7. A lubricating oil composition of claim 6 wherein each R independently represents the remainder of an esterified alcohol containing from 4 to 8 carbon atoms and each Z represents hydrogen.

8. A lubricating oil composition of claim 7 containing from 0.2–5% weight sulfur from said sulfurized ester.

9. A lubricating oil composition comprising (A) a major amount of an oil of lubricating viscosity and an amount effective to impart extreme pressure and/or antiwear lubricating properties to said oil of a composition comprising a mixture of (A) the reaction product of sulfur with an aliphatic ester of an olefinic mono- or dicarboxylic acid which does not contain any allylic hydrogen atoms, and (B) the reaction product of sulfur monochloride or sulfur dichloride and said ester.

* * * * *